United States Patent
Kumano et al.

(10) Patent No.: US 10,854,083 B2
(45) Date of Patent: Dec. 1, 2020

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takayasu Kumano, Wako (JP); Takuya Niioka, Wako (JP); Kazuma Ohara, Wako (JP); Suguru Yanagihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/686,463

(22) Filed: Nov. 18, 2019

(65) Prior Publication Data
US 2020/0168097 A1 May 28, 2020

(30) Foreign Application Priority Data
Nov. 27, 2018 (JP) .................................. 2018-221428

(51) Int. Cl.
*B60W 10/20* (2006.01)
*B60W 10/04* (2006.01)
(Continued)

(52) U.S. Cl.
CPC .............. *G08G 1/166* (2013.01); *B60W 10/20* (2013.01); *B60W 50/14* (2013.01);
(Continued)

(58) Field of Classification Search
None
See application file for complete search history.

(56) References Cited

U.S. PATENT DOCUMENTS

2003/0236616 A1* 12/2003 Kawakami ......... G01C 21/3632
701/468
2016/0161271 A1* 6/2016 Okumura ............... G01C 21/34
701/25

FOREIGN PATENT DOCUMENTS

JP 2000-073807 3/2000
JP 2005-301884 10/2005
(Continued)

OTHER PUBLICATIONS

Japanese Office Action for Japanese Patent Application No. 2018-221428 dated Sep. 23, 2020.

*Primary Examiner* — John F Mortell
(74) *Attorney, Agent, or Firm* — Amin, Turocy & Watson, LLP (57) ABSTRACT

A vehicle control device includes a recognizer configured to recognize a surrounding situation of a vehicle, a determiner configured to determine that entry into an intersection is allowed, on the basis of a certain determination condition, when the recognizer has recognized that there is the intersection ahead of the vehicle, a driving controller configured to cause the vehicle to enter the intersection when the determiner has determined that the entry into the intersection is allowed, and a condition changer configured to change the determination condition to a condition under which it is easier for the entry into the intersection to be determined to be allowed in a case in which the intersection recognized by the recognizer is a circular intersection, in comparison with a case in which the intersection recognized by the recognizer is another intersection different from the circular intersection.

7 Claims, 9 Drawing Sheets

(51) Int. Cl.
  *G08G 1/16* (2006.01)
  *B60W 50/14* (2020.01)
  *G05D 1/00* (2006.01)
  *G08G 1/052* (2006.01)
  *G08G 1/0967* (2006.01)

(52) U.S. Cl.
  CPC ........... *G05D 1/0088* (2013.01); *G08G 1/052* (2013.01); *G08G 1/096725* (2013.01); *G05D 2201/0213* (2013.01)

(56) References Cited

FOREIGN PATENT DOCUMENTS

| | | |
|---|---|---|
| JP | 2010-107305 | 5/2010 |
| JP | 2013-096744 | 5/2013 |
| JP | 2017-073072 | 4/2017 |
| JP | 2017-174282 | 9/2017 |

* cited by examiner

VEHICLE CONTROL DEVICE, VEHICLE CONTROL METHOD, AND STORAGE MEDIUM

CROSS-REFERENCE TO RELATED APPLICATION

The present application claims priority based on Japanese Patent Application No. 2018-221428, filed on Nov. 27, 2018, the content of which is incorporated herein by reference.

BACKGROUND

Field of the Invention

The present invention relates to a vehicle control device, a vehicle control method, and a storage medium.

Description of Related Art

In recent years, installation of circular intersections has become widespread. In connection therewith, a technology for causing a driver of a vehicle about to enter a circular intersection to recognize that there is a vehicle traveling on a circulating road or a vehicle about to enter the circular intersection from another road is known (see, for example, Japanese Unexamined Patent Application, First Publication No. 2005-301884). Further, a technology for predicting a behavior of a vehicle at a circular intersection and a technology for performing route guidance at a circular intersection are known (see, for example, Japanese Unexamined Patent Application, First Publication No. 2010-107305 and Japanese Unexamined Patent Application, First Publication No. 2013-096744).

SUMMARY

However, in the related art, it is easier for a traffic jam or the like to occur at an intersection in which a plurality of other roads do not perpendicularly intersect a certain road, such as a circular intersection, in comparison with an intersection in which a plurality of other roads perpendicularly intersect a certain road, and smooth traffic flow cannot be realized in some cases.

Aspects of the present invention provide a vehicle control device, a vehicle control method, and a storage medium that can further smooth traffic.

A vehicle control device, a vehicle control method, and a storage medium according to the present invention have adopted the following configurations.

(1) An aspect of the present invention is a vehicle control device including: a recognizer configured to recognize a surrounding situation of a vehicle; a determiner configured to determine that entry into an intersection is allowed, on the basis of a certain determination condition, when the recognizer has recognized that there is the intersection ahead in a traveling direction of the vehicle; a driving controller configured to cause the vehicle to enter the intersection by controlling one or both of steering and a speed of the vehicle when the determiner has determined that the entry into the intersection is allowed; and a condition changer configured to change the determination condition to a condition under which it is easier for the entry into the intersection to be determined to be allowed in a case in which the intersection recognized by the recognizer is a circular intersection, in comparison with a case in which the intersection recognized by the recognizer is another intersection different from the circular intersection.

According to an aspect (2), in the vehicle control device according to the aspect (1), when the intersection recognized by the recognizer is a circular intersection, the condition changer is configured to change the determination condition to a condition under which it is easy for the entry into the intersection to be determined to be allowed, according to an angle of entry into the circular intersection.

According to an aspect (3), in the vehicle control device according to the aspect (1) or (2), the condition changer does not change the determination condition when a partial section of a ring road included in the circular intersection has a straight line shape and the length of the partial section is equal to or greater than a predetermined distance.

According to an aspect (4), in the vehicle control device of the aspect (3), the condition changer is configured to change the determination condition to a condition under which it is easy for the entry into the intersection to be determined to be allowed, even when the partial section has the straight line shape and the length of the partial section is equal to or greater than the predetermined distance, in a case in which a road for entry into the circular intersection intersects the partial section at an angle larger than a right angle with respect to a horizontal direction.

(5) Another aspect of the present invention is a vehicle control device including: a recognizer configured to recognize a surrounding situation of a vehicle; a determiner configured to determine that entry to a second road different from a first road in which there is the vehicle is allowed, on the basis of a determination condition, when the vehicle enters the second road from the first road among a plurality of lanes recognized as the surrounding situation by the recognizer; a driving controller configured to control one or both of steering and a speed of the vehicle to cause the vehicle to enter the second road when the determiner has determined that the entry to the second road is allowed; and a condition changer configured to change the determination condition to a condition under which it is easier for the entry into the second road to be determined to be allowed when the first road does not perpendicularly intersect the second road with respect to a horizontal direction, in comparison with a case in which the first road perpendicularly intersects the second road.

(6) Yet another aspect of the present invention is a vehicle control method including: recognizing, by an in-vehicle computer, a surrounding situation of a vehicle; determining, by the in-vehicle computer, that entry into an intersection is allowed, on the basis of a determination condition, when having recognized that there is the intersection ahead in a traveling direction of the vehicle; causing, by the in-vehicle computer, the vehicle to enter the intersection by controlling one or both of steering and a speed of the vehicle when having determined that the entry into the intersection is allowed; and changing, by the in-vehicle computer, the determination condition to a condition under which it is easier for the entry into the intersection to be determined to be allowed in a case in which the recognized intersection is a circular intersection, in comparison with a case in which the recognized intersection is another intersection different from the circular intersection.

(7) Yet another aspect of the present invention is a computer-readable non-transitory storage medium storing a program, the program causing an in-vehicle computer to execute: a process of recognizing a surrounding situation of a vehicle; a process of determining that entry into an intersection is allowed, on the basis of a determination condition, when having recognized that there is the intersection ahead in a traveling direction of the vehicle; a process of causing the vehicle to enter the intersection by controlling one or both of steering and a speed of the vehicle when having determined that the entry into the intersection is allowed; and a process of changing the determination condition to a condition under which it is easier for the entry into the intersection to be determined to be allowed in a case in which the recognized intersection is a circular intersection, in comparison with a case in which the recognized intersection is another intersection different from the circular intersection.

According to the aspects (1) to (7), it is possible to further smooth traffic.

DESCRIPTION OF EMBODIMENTS

Hereinafter, embodiments of a vehicle control device, a vehicle control method, and a storage medium of the present invention will be described with reference to the drawings. The vehicle control device of the embodiment is applied to automated driving vehicles. The automated driving is, for example, to control one or both of steering and acceleration/deceleration of a vehicle so that driving control is executed. An example of the driving control described above includes control for assisting in a driving operation of an occupant, such as an Adaptive Cruise Control System (ACC) or Lane Keeping Assistance System (LKAS). Further, hereinafter, a case in which left-hand driving is applied will be described, but right and left may be reversed when right-hand driving is applied. Further, in the following description, one direction in a horizontal direction is X, the other direction is Y, and a vertical direction orthogonal to the X-Y horizontal direction is Z.

First Embodiment

[Overall Configuration]

Figure 1:
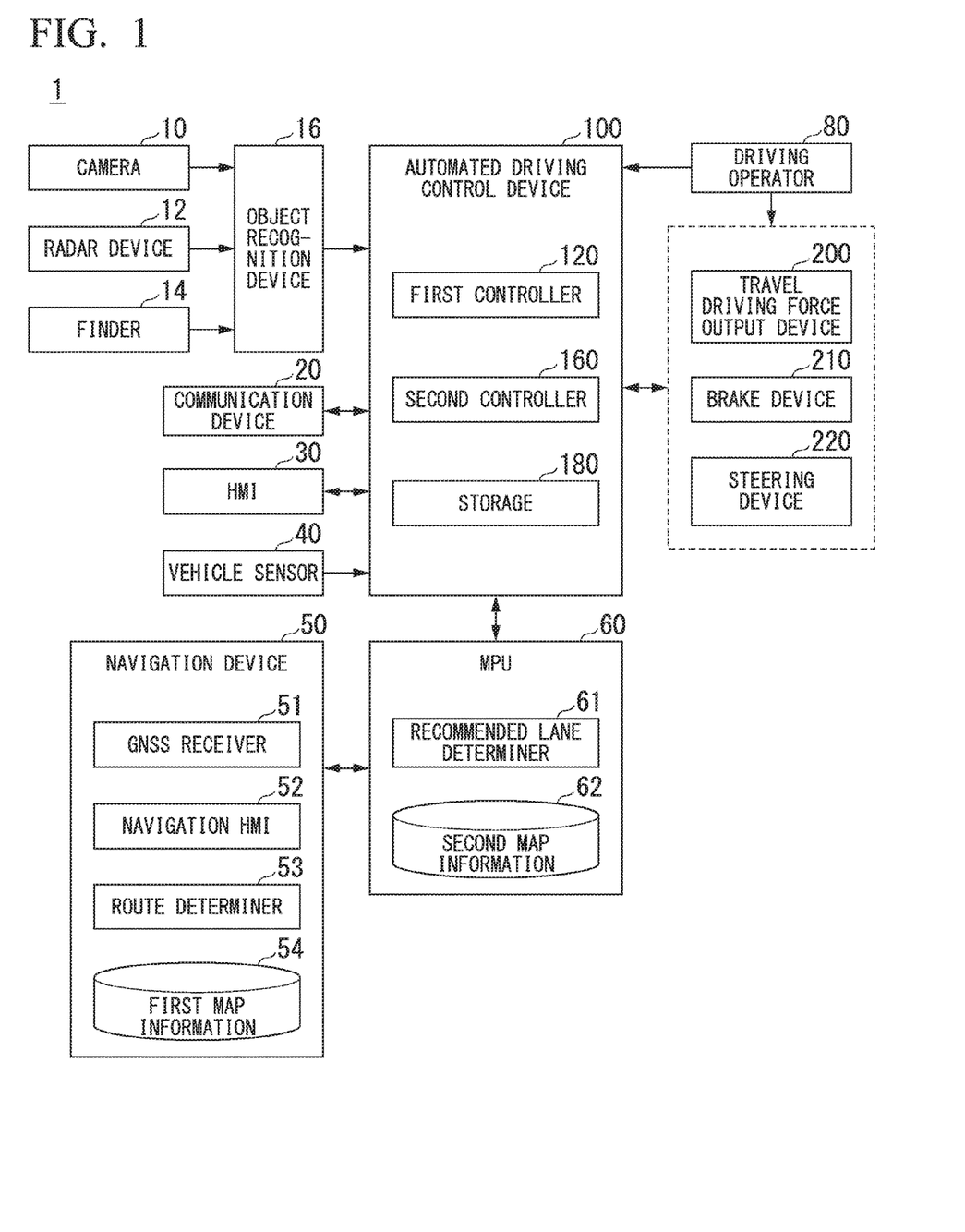
FIG. 1 is a configuration diagram of a vehicle system using a vehicle control device according to a first embodiment.

FIG. 1 is a configuration diagram of a vehicle system 1 using a vehicle control device according to a first embodiment. A vehicle in which the vehicle system 1 is mounted (hereinafter referred to as a host vehicle M) is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to any place on the host vehicle M. In the case of forward imaging, the camera 10 is attached to an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR). The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the subject vehicle M and receives an input operation from the occupant. The HMI 30 includes various display devices, speakers, buzzers, touch panels, switches, keys, and the like.

The vehicle sensor 40 includes, for example, a vehicle speed sensor that detects a speed of the subject vehicle M, an acceleration sensor that detects an acceleration, a yaw rate sensor that detects an angular speed around a vertical axis, and an orientation sensor that detects a direction of the subject vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies a position of the subject vehicle M on the basis of a signal received from a GNSS satellite. The position of the subject vehicle M may be specified or supplemented by an inertial navigation system (INS) using an output of the vehicle sensor 40.

The navigation HMI 52 includes a display device, a speaker, a touch panel, keys, and the like. The navigation HMI 52 may be partly or wholly shared with the above-described HMI 30.

The route determiner 53, for example, determines a route (hereinafter, an on-map route) from the position of the subject vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and information on an intersection. The information on an intersection includes, for example, coordinates of the intersection on a map, or a type of intersection such as a circular intersection (roundabout), a three-way intersection, a four-way intersection, or a scramble intersection. The circular intersection is an intersection in which three or more roads are connected to each other via a one-way circulating road (ring road). In principle, on an circulating road, no traffic lights are installed and there is no obligation to temporarily stop at the time of entry into the circulating road. The route determiner 53 outputs the determined on-map route to the MPU 60.

The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the subject vehicle M travels.

The recommended lane determiner 61 determines the recommended lane so that the subject vehicle M can travel on a reasonable route for progression to a branch destination when there is a branch place in the on-map route.

The second map information 62 is map information with higher accuracy than the first map information 54. The second map information 62 includes, for example, information on a center of the lane or information on a boundary of the lane, and information on a type of the lane. Further, the second map information 62 may include road information, traffic regulation information, address information (an address and postal code), facility information, telephone number information, and the like. Further, the second map information 62 may include information indicating intersection angles (formed angles) of a plurality of lanes (roads) that intersect at an intersection. The second map information 62 may be updated at any time by the communication device 20 communicating with another device.

The driving operator 80 includes, for example, an accelerator pedal, a brake pedal, a shift lever, a steering wheel, a variant steer, a joystick, and other operators. A sensor that detects the amount of operation or the presence or absence of operation is attached to the driving operator 80, and a detection result is output to the automated driving control device 100 or some or all of the travel driving force output device 200, the brake device 210, and the steering device 220.

The automated driving control device 100 includes, for example, a first controller 120, a second controller 160, and a storage 180. The first controller 120 and the second controller 160 are realized, for example, by a processor such as a central processing unit (CPU) or a graphics processing unit (GPU) executing a program (software). Further, some or all of these components may be realized by hardware (including circuitry) such as a large scale integration (LSI), an application specific integrated circuit (ASIC), or a field-programmable gate array (FPGA) or may be realized by software and hardware in cooperation. The program may be stored in the storage 180 of the automated driving control device 100 in advance or may be stored in a removable storage medium such as a DVD or a CD-ROM and the storage medium may be mounted in a drive device so that the program may be installed in the storage 180.

The storage 180 is realized by, for example, an HDD, a flash memory, an electrically erasable programmable read-only memory (EEPROM), a read only memory (ROM), or a random access memory (RAM). The storage 180 stores, for example, a program that is read and executed by a processor.

Figure 2:
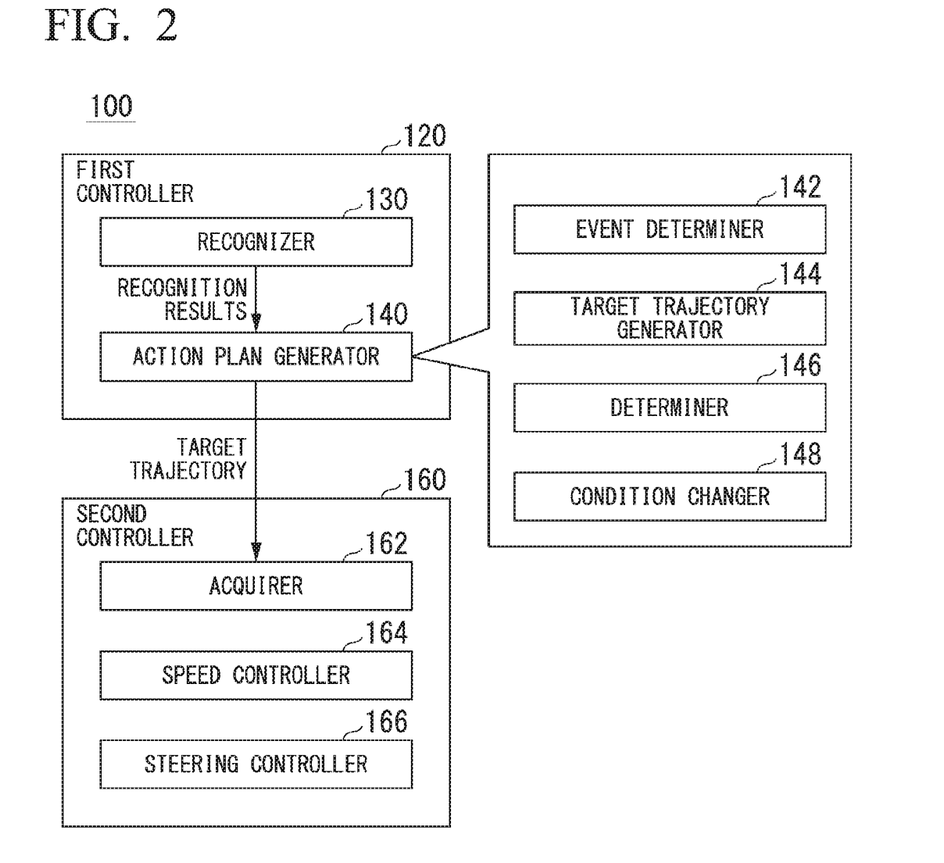
FIG. 2 is a functional configuration diagram of a first controller and a second controller.

FIG. 2 is a functional configuration diagram of the first controller 120, and the second controller 160. The first controller 120 includes, for example, a recognizer 130 and an action plan generator 140. The first controller 120 realizes, for example, a function using artificial intelligence (AI) and a function using a previously given model in parallel. For example, a function of "recognizing an intersection" may be realized by recognition of the intersection using deep learning or the like and recognition on the basis of previously given conditions (a signal which can be subjected to pattern matching, a road sign, or the like) being executed in parallel and scored for comprehensive evaluation. Accordingly, the reliability of automated driving is guaranteed.

The recognizer 130 recognizes a surrounding situation of the subject vehicle M on the basis of information input from the camera 10, the radar device 12, and the finder 14 via the object recognition device 16. For example, the recognizer 130 recognizes a state such as a position, speed, or acceleration of an object present around the host vehicle M, as the surrounding situation. Examples of the object recognized as the surrounding situation include moving objects such as pedestrians or other vehicles, or obstacles such as construction tools. The position of the object, for example, is recognized as a position at absolute coordinates with a representative point (a centroid, a drive shaft center, or the like) of the subject vehicle M as an origin, and is used for control. The position of the object may be represented by a representative point such as a centroid or a corner of the object or may be represented by an area having a spatial extent. The "state" of the object may include an acceleration or jerk of the object, or an "action state" (for example, whether or not the object is changing lanes or is about to change lanes).

Further, for example, the recognizer 130 recognizes a lane in which the host vehicle M is traveling (hereinafter referred to as a host lane), an adjacent lane adjacent to the host lane, or the like as the surrounding situation. For example, the recognizer 130 compares a pattern of a road marking line (for example, an arrangement of a solid line and a broken line) obtained from the second map information 62 with a pattern of a road marking line around the host vehicle M recognized from an image captured by the camera 10 to recognize the host lane or the adjacent lane. The recognizer 130 may recognize not only the road marking lines but also a traveling road boundary (a road boundary) including the road marking line, a road shoulder, a curb, a median strip, a guard rail, or the like to recognize the host lane or the adjacent lane. In this recognition, the position of the host vehicle M acquired from the navigation device 50 or a processing result of an INS may be additionally considered. Further, the recognizer 130 may recognize a sidewalk, a stop line (including a temporary stop line), an obstacle, a red light, a toll gate, a road structure, and other road events.

The recognizer 130 recognizes a relative position or posture of the host vehicle M with respect to the host lane when recognizing the host lane. The recognizer 130 may recognize, for example, a deviation of a reference point of the host vehicle M from a center of the lane and an angle formed between a traveling direction of the host vehicle M and a line connecting the center of the lane as the relative position and posture of the host vehicle M with respect to the host lane. Instead, the recognizer 130 may recognize, for example, a position of the reference point of the host vehicle M with respect to any one of side end portions (the road marking line or the road boundary) of the host lane as the relative position of the host vehicle M with respect to the host lane.

Further, for example, the recognizer 130 may recognize that there is an intersection ahead in the traveling direction of the host vehicle M on the basis of the first map information 54 or the second map information 62, and further recognize a type of recognized intersection.

Further, for example, the recognizer 130 may recognize a width, shape, or the like of a road or a lane or recognize a character or a road sign drawn on a road surface of the road on the basis of the image captured by the camera 10 to recognize that there is an intersection ahead in the traveling direction of the host vehicle M and to recognize a type of recognized intersection.

The action plan generator 140 includes, for example, an event determiner 142, a target trajectory generator 144, a determiner 146, and a condition changer 148. The event determiner 142 determines an automated driving event in a route in which the recommended lane has been determined. The event is information defining a traveling aspect of the host vehicle M.

Examples of the event include a constant-speed traveling event in which the host vehicle M is caused to travel in the same lane at a constant speed, a following traveling event in which the host vehicle M is caused to follow another vehicle (hereinafter referred to as a preceding vehicle) present within a predetermined distance (for example, within 100 m) in front of the host vehicle M and closest to the host vehicle M, a lane change event in which the host vehicle M is caused to perform lane change from the host lane to an adjacent lane, a branching event in which the host vehicle M is caused to branch to a lane on the destination side at a branch point of a road, and a merging event in which the host vehicle M is caused to merge with a main lane at a merging point, and an intersection passing event in which the host vehicle M is caused to enter an intersection. "Following" may be, for example, a traveling aspect in which a relative distance (an inter-vehicle distance) between the host vehicle M and the preceding vehicle is kept constant, or a traveling aspect in which the host vehicle M is caused to travel in a center of the host lane, in addition to the relative distance between the host vehicle M and the preceding vehicle being kept constant. Further, examples of the event may include an overtaking event in which the host vehicle M is first caused to perform lane change to an adjacent lane, overtake a preceding vehicle in the adjacent lane, and then, perform lane change to an original lane again, an avoidance event in which the host vehicle M is caused to perform at least one of braking and steering in order to avoid an obstacle OB present in front of the host vehicle M, and a takeover event for ending automated driving and performing switching to manual driving.

Further, the event determiner 142 may change an event already determined for a current section or a next section to another event or determine a new event for the current section or the next section according to the surrounding situation recognized by the recognizer 130 when the host vehicle M is traveling.

The target trajectory generator 144 generates a future target trajectory in which the host vehicle M will travel in the recommended lane determined by the recommended lane determiner 61 in principle, and the host vehicle M is caused to travel automatically (without depending on a driver's operation) in a traveling aspect defined by the events in order to cope with the surrounding situation when the host vehicle M travels in the recommended lane. The target trajectory includes, for example, a position element that defines a future position of the host vehicle M, and a speed element that defines a future speed, acceleration, or the like of the host vehicle M.

For example, the target trajectory generator 144 determines a plurality of points (trajectory points) that the host vehicle M is to reach in order, as the position elements of the target trajectory. The trajectory point is a point that the host vehicle M is to reach for each predetermined traveling distance (for example, several [m]). The predetermined traveling distance may be calculated, for example, using a road distance when the host vehicle M travels along the route.

Further, the target trajectory generator 144 determines a target speed or a target acceleration at every predetermined sampling time (for example, every several tenths of a [sec]) as the speed elements of the target trajectory. Further, the trajectory points for each sampling time may be positions that the host vehicle M will reach at predetermined sampling times. In this case, the target speed or the target acceleration is determined using the sampling time and an interval between the trajectory points. The target trajectory generator 144 outputs information indicating the generated target trajectory to the second controller 160.

The determiner 146 determines whether or not the host vehicle M is allowed to enter the intersection on the basis of a certain determination condition when the recognizer 130 has recognized that there is the intersection ahead in the traveling direction of the host vehicle M and the host vehicle M has reached a section at which the intersection passing event has been planned by the event determiner 142.

An example of the determination condition includes a condition that the host vehicle M does not interfere with another vehicle present within the intersection or a condition that a speed $V_M$ of the host vehicle M at the time of entry into the intersection is equal to or lower than an upper limit speed $V_{TH}$.

"Does not interfere with another vehicle", for example, may be a relative distance between the host vehicle M and the other vehicle being equal to or greater than a threshold value, or may be the relative speed between the host vehicle M and the other vehicle being equal to or greater than the threshold value or a time-to-collision (TTC) obtained by dividing the relative distance between the host vehicle M and the other vehicle by a relative speed between the host vehicle M and the other vehicle being equal to or greater than a threshold value. Further, when there are a plurality of other vehicles within the intersection, the determination condition may include a condition that a relative distance between two other vehicles that the host vehicle M is inserted is equal to or greater than a threshold value, a condition that a relative speed between the two other vehicles is equal to or greater than a threshold value, or a condition that a TTC of the two other vehicles is equal to or greater than a threshold value.

The upper limit speed $V_{TH}$ is, for example, a speed at which a lateral acceleration generated in the host vehicle M (an acceleration in a vehicle width direction) or a lateral acceleration generated for an occupant getting on the host vehicle M becomes equal to or lower than a threshold value.

When the determiner 146 has determined that the entry into the intersection is allowed, the target trajectory generator 144 generates a target trajectory from the host lane that is a road for entry into the intersection to within the intersection. For example, the target trajectory generator 144 generates a target trajectory including, for example, a target speed equal to or lower than the upper limit speed $V_{TH}$, as a speed element.

On the other hand, when the determiner 146 has determined that the entry into the intersection is not allowed, the target trajectory generator 144 generates a target trajectory in which the host vehicle M is caused to wait on the host lane that is the road for entry into the intersection. For example, the target trajectory generator 144 generates a target trajectory including a target speed or target acceleration that is zero or is small enough to be regarded as zero, as the speed element.

In a case in which the intersection recognized by the recognizer 130 is a circular intersection, the condition changer 148 changes the determination condition referred to by the determiner 146 to a condition under which it is easier for the entry into the intersection to be determined to be allowed, in comparison with a case in which the intersection recognized by the recognizer 130 is another intersection (for example, a three-way intersection or a scramble intersection) of a type different from the circular intersection.

The second controller 160 controls the travel driving force output device 200, the brake device 210, and the steering device 220 so that the host vehicle M passes through the target trajectory generated by the target trajectory generator 144 at a scheduled time.

The second controller 160 includes, for example, an acquirer 162, a speed controller 164, and a steering controller 166. A combination of the event determiner 142, the target trajectory generator 144, and the second controller 160 is an example of a "driving controller".

The acquirer 162 acquires information on the target trajectory (trajectory points) generated by the target trajectory generator 144 and stores the information in the memory of the storage 180.

The speed controller 164 controls one or both of the travel driving force output device 200 and the brake device 210 on the basis of the speed element (for example, the target speed or target acceleration) included in the target trajectory stored in the memory.

The steering controller 166 controls the steering device 220 according to the position element (for example, a curvature indicating a degree of curvature of the target trajectory) included in the target trajectory stored in the memory.

Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation of the host vehicle M from the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and a power electronic control unit (ECU) that controls these. The power ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Processing Flow]

Figure 3:
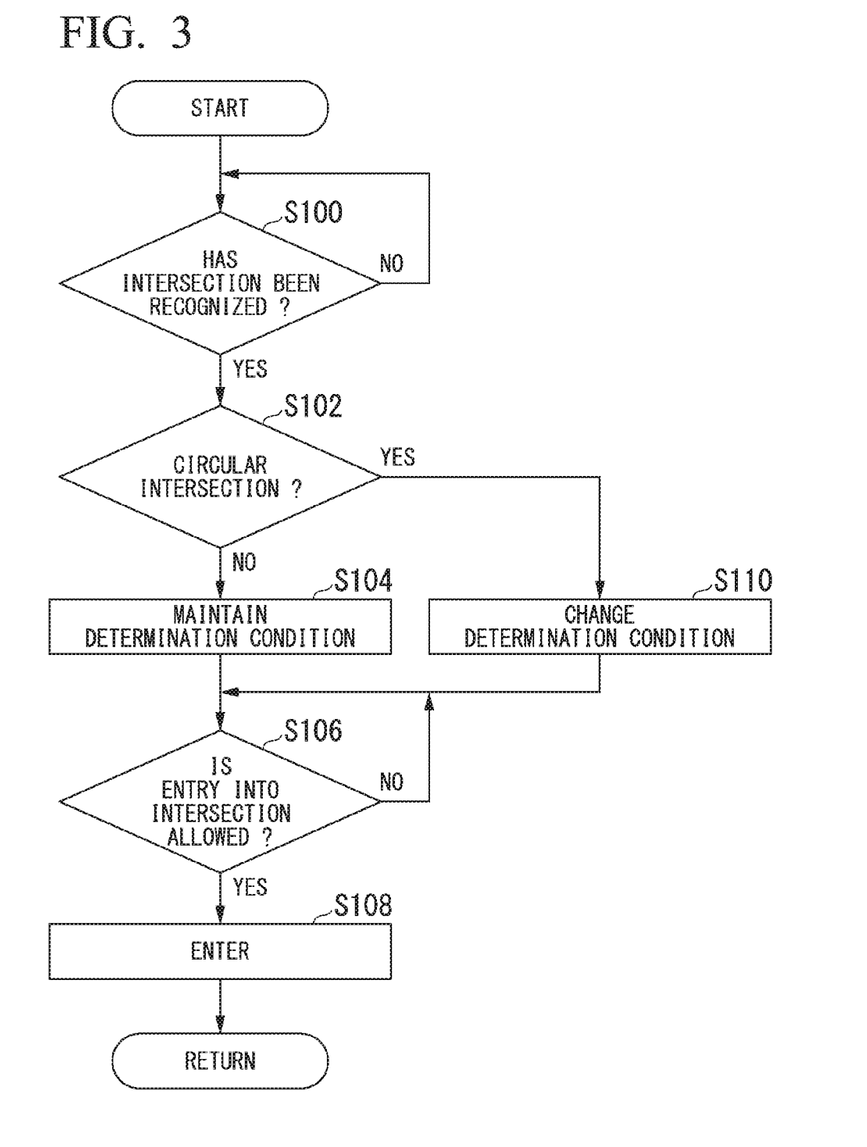
FIG. 3 is a flowchart showing an example of a flow of a series of processes of an automated driving control device of the first embodiment.

Hereinafter, a flow of a series of processes of the automated driving control device 100 according to the first embodiment will be described with reference to a flowchart. FIG. 3 is a flowchart showing an example of the flow of a series of processes of the automated driving control device 100 according to the first embodiment. For example, a process of this flowchart may be repeatedly performed in a predetermined cycle.

First, the condition changer 148 determines whether or not the recognizer 130 has recognized that there is the intersection ahead in the traveling direction of the host vehicle M (step S100), and determines whether or not the intersection is a circular intersection when the recognizer 130 has recognized that there is the intersection ahead in the traveling direction of the host vehicle M (step S102).

When the condition changer 148 has determined that the intersection is not the circular intersection but another type of intersection, the condition changer 148 maintains the determination condition referred to by the determiner 146 without changing the determination condition (step S104).

Then, the determiner 146 determines whether or not the host vehicle M can enter the intersection on the basis of the determination condition (step S106).

Figure 4:
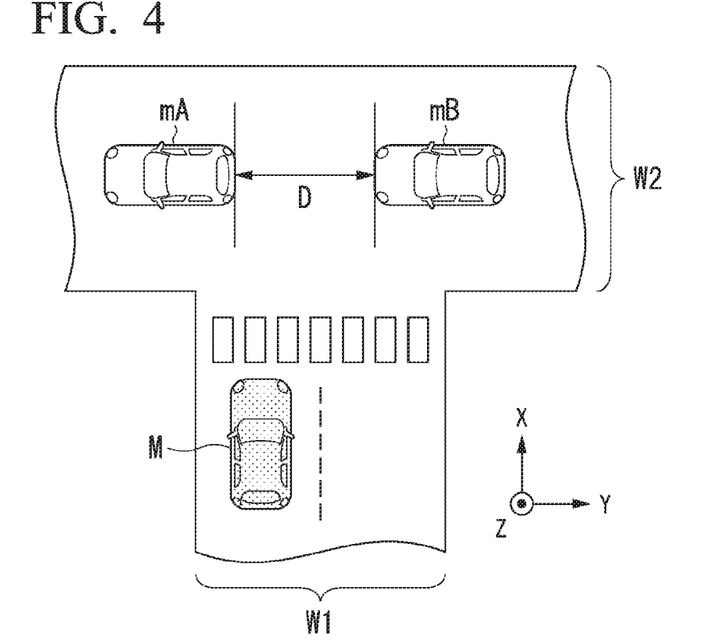
FIG. 4 is a diagram showing an example of a scene in which a determination is made as to whether or not entry into an intersection is allowed.
Figure 5:
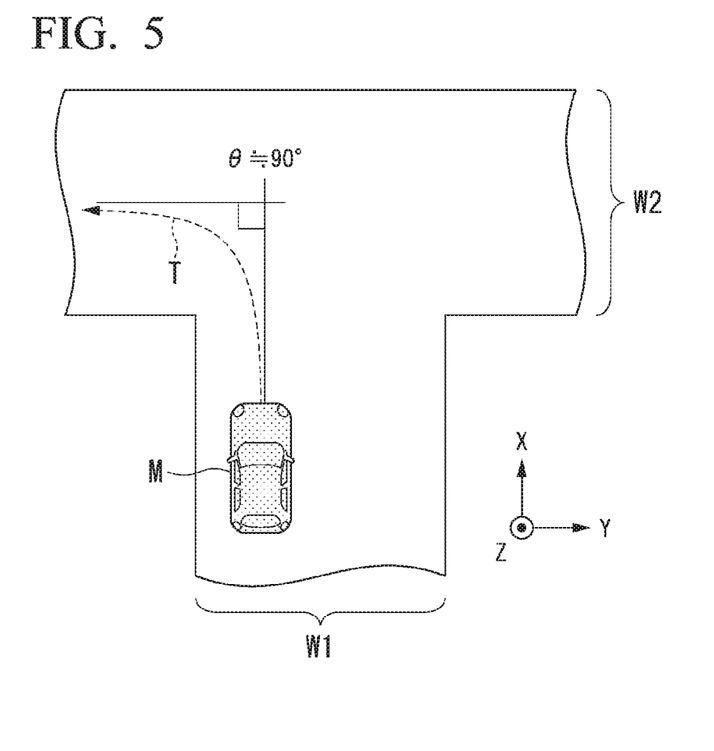
FIG. 5 is a diagram showing an example of a scene in which a determination is made as to whether or not entry into an intersection is allowed.

FIGS. 4 and 5 are diagrams showing an example of a scene in which a determination is made as to whether or not entry into an intersection is allowed. An intersection shown in FIGS. 4 and 5 represents a three-way road in which a road W1 including a host lane intersects an arterial road W2 substantially perpendicularly in an X-Y horizontal direction (within an X-Y horizontal plane). In FIG. 4, there are a first other vehicle mA and a second other vehicle mB on the arterial road W2 within the intersection. For example, when the determination condition includes a condition that relative distances between a plurality of other vehicles present within the intersection are equal to or greater than a threshold value, the determiner 146 determines whether or not a relative distance D between the first other vehicle mA and the second other vehicle mB is equal to or greater than a threshold value.

Further, when the determination condition includes a condition that the speed $V_M$ of the host vehicle M at the time of entry into the intersection is equal to or lower than the upper limit speed $V_{TH}$, the determiner 146 determines whether or not the host vehicle M can be caused to be inserted between the first other vehicle mA and the second other vehicle mB at a speed equal to or lower than the upper limit speed $V_{TH}$. Specifically, the determiner 146 derives a turning angle (hereinafter referred to as an entry angle θ) when the host vehicle M is caused to enter the intersection, and determines the upper limit speed $V_{TH}$ on the basis of the derived entry angle θ. As shown in FIG. 5, for example, the determiner 146 regards the target trajectory (T in FIG. 5) generated by the target trajectory generator 144 as a one-dimensional curve, obtains a plurality of tangents to the curve, and derives an angle formed between the plurality of tangents as the entry angle θ. Further, the determiner 146 may derive an intersection angle of an intersection included in the second map information 62 as the entry angle θ.

Figure 6:
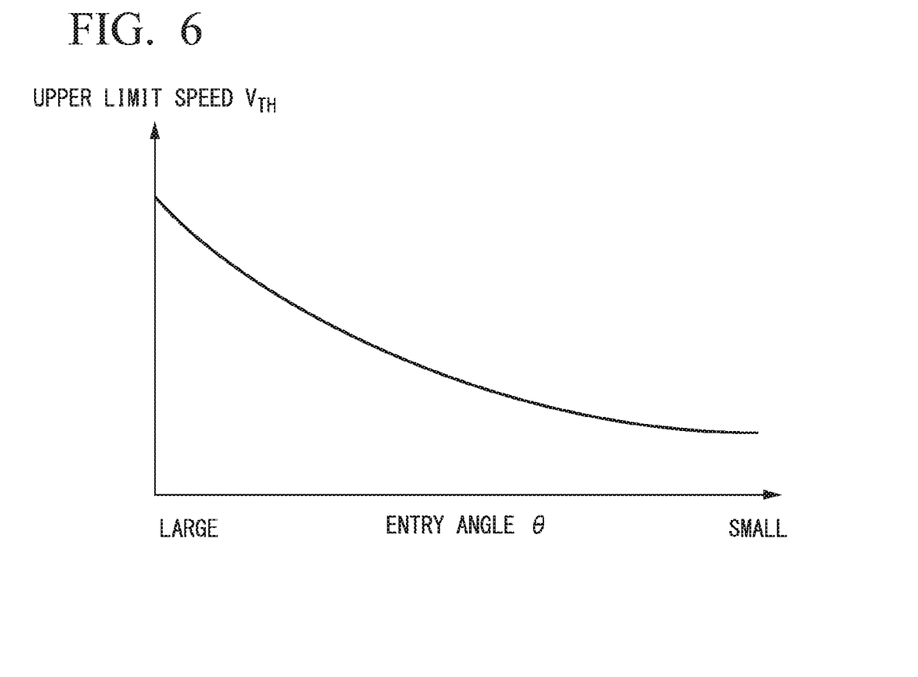
FIG. 6 is a diagram showing an example of a relationship between an entry angle and an upper limit speed.

FIG. 6 is a diagram showing an example of a relationship between the entry angle θ and the upper limit speed $V_{TH}$. When the determiner 146 derives the entry angle θ, the determiner 146 determines the upper limit speed $V_{TH}$ using a function or a table in which the upper limit speed $V_{TH}$ is associated with the entry angle θ in advance, as shown in FIG. 6. As in the shown example, when the entry angle θ decreases (becomes an acute angle), a lateral acceleration generated in the vehicle increases even when the vehicle speed is the same. Accordingly, the upper limit speed $V_{TH}$ is determined to be a smaller value when the entry angle θ decreases. When the host vehicle M has entered the intersection at a speed equal to or lower than the determined upper limit speed $V_{TH}$, the determiner 146 determines whether or not the host vehicle M will interfere with the first other vehicle mA and the second other vehicle mB.

Figure 7:
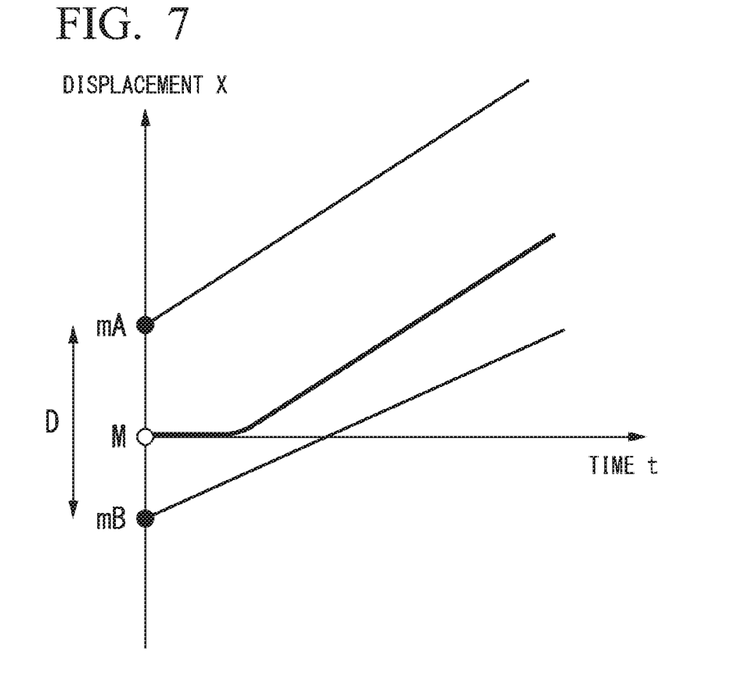
FIG. 7 is a diagram showing an example of a positional relationship of respective vehicles at the time of entry into an intersection.

FIG. 7 is a diagram showing an example of a positional relationship between respective vehicles at the time of entry into the intersection. In FIG. 7, a vertical axis x indicates a displacement in a traveling direction that is along the road W2, and a horizontal axis t indicates an elapsed time. For example, the determiner 146 determines that the host vehicle M does not interfere with the first other vehicle mA and the second other vehicle mB, that is, the host vehicle M is allowed to enter the intersection (the determination condition is satisfied) when a speed in a speed range in which the position of the host vehicle M does not move in front of the first other vehicle mA and does not move behind the second other vehicle mB is a speed equal to or lower than the upper limit speed $V_{TH}$, on the basis of a constant speed model in which it is assumed that the first other vehicle mA and the second other vehicle mB travel while keeping a speed at a point in time when the first other vehicle mA and the second other vehicle mB have been recognized by the recognizer 130, and a constant speed model in which it is assumed that the host vehicle M travels while keeping a speed equal to or lower than the upper limit speed $V_{TH}$.

Referring back to the description of the flowchart in FIG. 3, when the determiner 146 has determined that the entry into the intersection is allowed (when the determination condition is satisfied), the target trajectory generator 144 generates a target trajectory from the road M1 to the road M2 to cause the host vehicle M to enter the intersection. Then, the second controller 160 controls the speed and steering of the host vehicle M according to the target trajectory to cause the host vehicle M to enter the intersection (step S108).

On the other hand, when the determiner 146 has determined that the entry into the intersection is not allowed (when the determination condition is not satisfied), the target trajectory generator 144 generates a target trajectory in which the host vehicle M is caused to wait on the road W1 until the determiner 146 determines that the entry into the intersection is allowed.

On the other hand, when the condition changer 148 has determined in the process of S102 that the intersection is the circular intersection, the condition changer 148 changes the determination condition referred to by the determiner 146 to a condition under which it is easier for the entry into the circular intersection to be determined to be allowed, in comparison with a case in which the intersection is another type of intersection (step S110).

Figure 8:
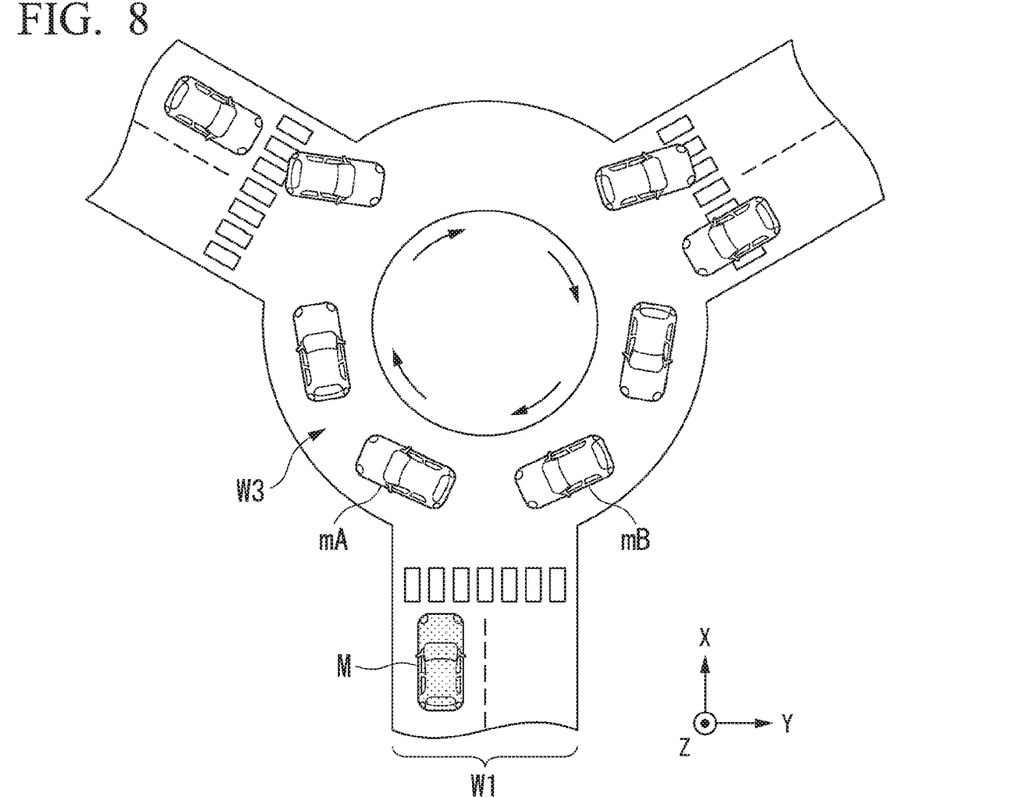
FIG. 8 is a diagram showing another example of the scene in which the determination is made as to whether or not the entry into the intersection is allowed.
Figure 9:
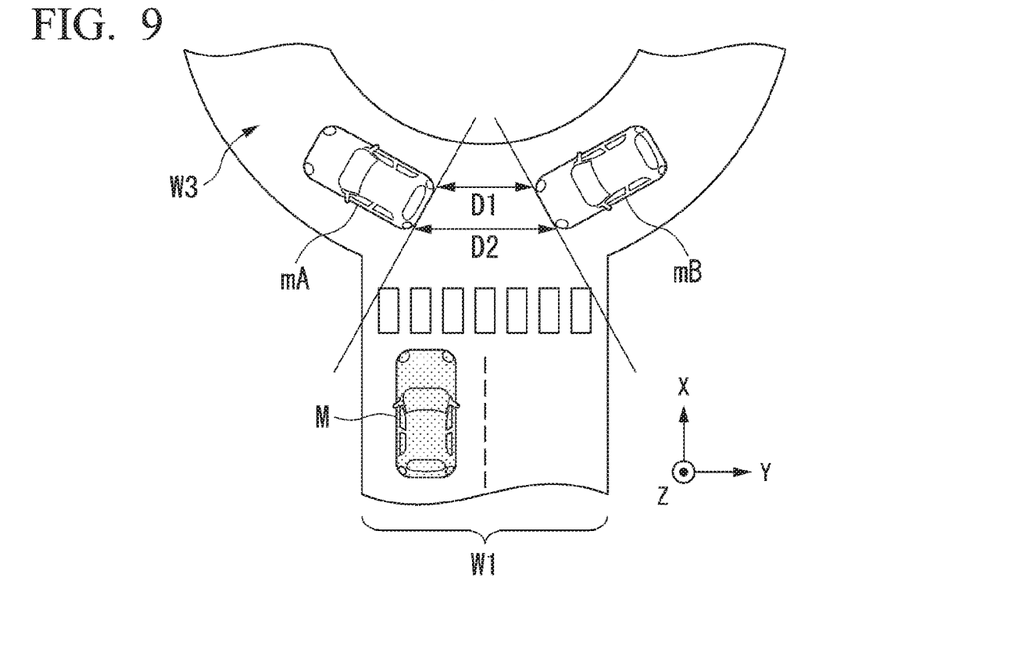
FIG. 9 is a diagram showing another example of the scene in which the determination is made as to whether or not the entry into the intersection is allowed.
Figure 10:
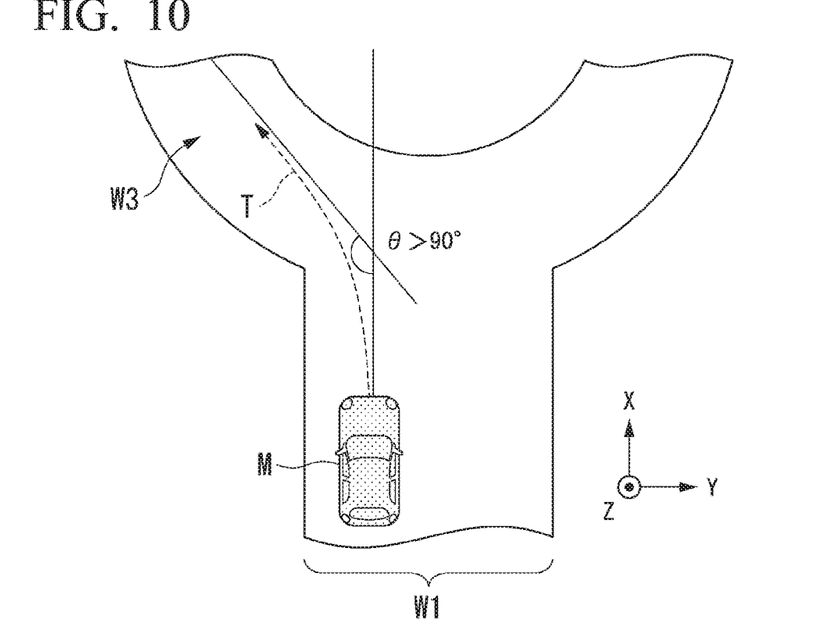
FIG. 10 is a diagram showing another example of the scene in which the determination is made as to whether or not the entry into the intersection is allowed.

FIGS. 8 to 10 are diagrams showing other examples of scenes in which a determination is made as to whether or not entry into an intersection is allowed. The intersection shown in FIGS. 8 to 10 indicates a circular intersection in which a road W1 including a host lane intersects an circulating road W3. In the scene shown in FIG. 8, there are a plurality of other vehicles on the circulating road W3 at the circular intersection, and a traffic jam occurs. In such a scene, the host vehicle M needs to be smoothly inserted between a plurality of other vehicles present on the circulating road W3. For example, in the scene shown in FIG. 8, when it is assumed that the host vehicle M is caused to inserted between a first other vehicle mA and a second other vehicle mB, the determiner 146 determines whether or not a relative distance D between the first other vehicle mA and the second other vehicle mB, an entry angle θ, or the like is equal to or greater than a threshold value according to the determination condition.

FIG. 9 is a diagram showing the relative distance D between the first other vehicle mA and the second other vehicle mB. Since the first other vehicle mA and the second other vehicle mB are traveling on the circulating road W3 as in the shown example, a relative distance D2 on the outer side is greater than a relative distance D1 on the inner side of the circulating road W3, unlike a case in which these other vehicles are traveling on a road having a straight line shape. That is, the circulating road W3 has a larger space for insertion than a straight road.

FIG. 10 is a diagram showing the entry angle θ for entry into a circular intersection. When the host vehicle M enters the circulating road W3 from the road W1 having a substantially straight line shape as in the shown example, it is easy for a target trajectory from the road W1 to the circulating road W3 to have a smaller curvature than, for example, that of a three-way intersection that the road W1 perpendicularly intersects as shown in FIG. 4 or 5. As a result, it is easy for the entry angle θ to be higher (to be an obtuse angle). Therefore, at the circular intersection, the upper limit speed $V_{TH}$ can be higher in comparison with other types of intersection.

Considering the above, for example, when the host vehicle M enters the circular intersection, the condition changer 148 changes the determination condition to a condition under which it is easier for the entry into the circular intersection to be determined to be allowed, in comparison with the three-way intersection shown in FIGS. 4 and 5, by decreasing the threshold value for the relative distance, the TTC, or the like included in the determination condition or increasing the upper limit speed $V_{TH}$. Accordingly, for example, even if a relative distance between the first other vehicle mA and the second other vehicle mB traveling on the circulating road W3 at the circular intersection is short and it would originally have been determined that the entry into the intersection is not allowed, when the threshold value is made low, it becomes easy for the entry into the intersection to be determined to be allowed.

According to the first embodiment described above, the vehicle control device includes the recognizer 130 that recognizes the surrounding situation of the host vehicle M, the determiner 146 that determines that the entry into the intersection is allowed, on the basis of the determination condition, when the recognizer 130 has recognized that there is the intersection ahead in the traveling direction of the host vehicle M, the target trajectory generator 144 that generates the target trajectory when the determiner 146 has determined that the entry into the intersection is allowed, the second controller 160 that causes the host vehicle M to enter the intersection by controlling one or both of the steering and the speed of the host vehicle M on the basis of the target trajectory generated by the target trajectory generator 144, and the condition changer 148 that changes the determination condition referred to by the determiner 146 to the condition under which it is easier for the entry into the intersection to be determined to be allowed in a case in which the intersection recognized by the recognizer 130 is the circular intersection, in comparison with a case in which the intersection recognized by the recognizer 130 is another type of intersection such as a three-way intersection, such that the host vehicle M can rapidly enter the circular intersection. As a result, it is possible to further smooth traffic.

Second Embodiment

Hereinafter, a second embodiment will be described. In first embodiment described above, a case in which the determination condition is changed to the condition under which it is easier for the entry into the intersection to be determined to be allowed in a case in which the intersection present ahead in the traveling direction of the host vehicle M is the circular intersection, in comparison with a case in which the intersection is another type of intersection has been described. On the other hand, in the second embodiment, even when the intersection present ahead in the traveling direction of the host vehicle M is the circular intersection, the determination condition is not changed in a case in which a certain condition is satisfied. The second embodiment is different from the first embodiment described above in this respect. Differences from the first embodiment will be mainly described and a description of functions and the like that are the same as those in the first embodiment will be omitted.

Figure 11:
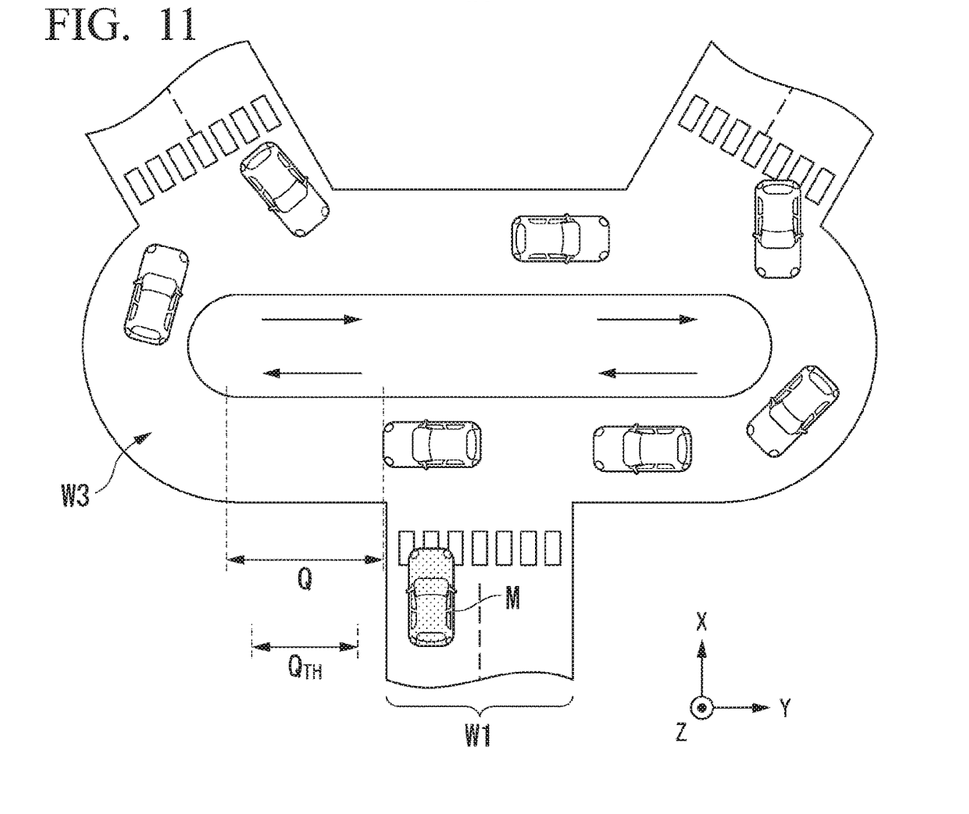
FIG. 11 is a diagram showing an example of a scene in which a determination is made as to whether or not entry into a circular intersection is allowed.

FIG. 11 is a diagram showing an example of a scene in which a determination is made as to whether or not entry into a circular intersection is allowed. As shown, for example, a part of an circulating road W3 at a circular intersection may be a road having a straight line shape (hereinafter referred to as a straight section). In such a case, a condition changer 148 according to the second embodiment determines whether or not the determination condition is changed according to a distance Q of the straight section in which the host vehicle M travels after the host vehicle M has moved from a road W1 including a host lane to the circulating road W3 at the circular intersection. The straight section is an example of a "partial section".

For example, the condition changer 148 does not change the determination condition when the distance Q of the straight section is equal to or greater than a predetermined distance $Q_{TH}$, that is, when a section after the host vehicle M has entered the circular intersection is a sufficiently long straight section. On the other hand, the condition changer 148 changes the determination condition when the distance Q of the straight section is smaller than the predetermined distance $Q_{TH}$, that is, when the section after the host vehicle M has entered the circular intersection is a relatively short straight section. The predetermined distance $Q_{TH}$ may be, for example, a distance that is substantially the same as a total length of an average vehicle. Thus, when there is the circular intersection ahead in the traveling direction of the host vehicle M, the determination condition is not immediately changed and the change of the determination condition is canceled in a case in which the straight section of the circular intersection road W3 is sufficiently long and a partial area of the circular intersection is regarded as another type of intersection such as a three-way intersection. Therefore, it is possible for the host vehicle M to enter the circular intersection at a more appropriate timing.

Further, even in a case in which the distance Q of the straight section is equal to or greater than the predetermined distance $Q_{TH}$, the condition changer 148 according to the second embodiment may change the determination condition to a condition under which it is easy for the entry into the intersection to be determined to be allowed, when the entry angle θ at the time of entry into the circulating road W3 from the road W1 including the host lane is larger than 90 degrees, that is, when the entry angle θ is an obtuse angle.

Figure 12:
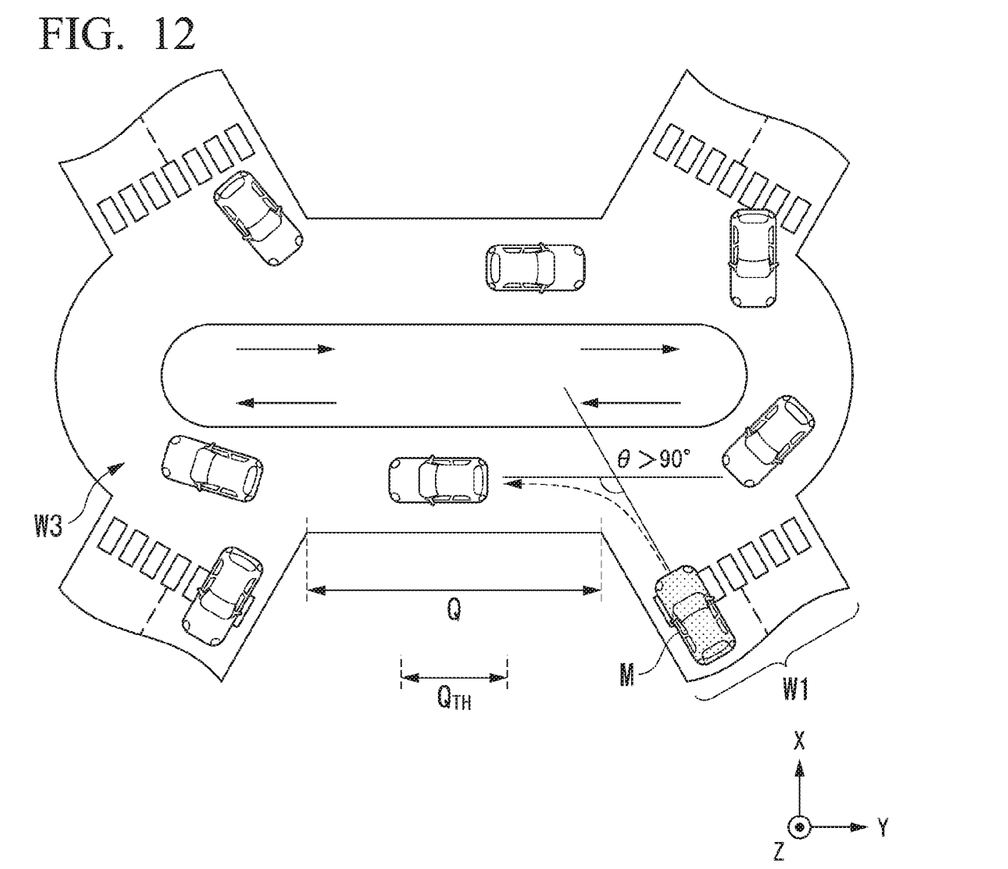
FIG. 12 is a diagram showing another example of the scene in which the determination is made as to whether or not the entry into the circular intersection is allowed.

FIG. 12 is a diagram showing another example of the scene in which the determination is made as to whether or not the entry into a circular intersection is allowed. In the shown example, although a distance Q of a straight section is equal to or greater than a predetermined distance $Q_{TH}$, a road W1, which is a road for entry into an circulating road W3, intersects the straight section at an angle larger than a right angle. In such a case, since an entry angle θ at the time of entry into the circulating road W3 from the road W1 becomes an obtuse angle equal to or larger than 90 degrees, the condition changer 148 changes the determination condition to a condition under which it is easy for the entry into the intersection to be determined to be allowed.

According to the second embodiment described above, when a part of the circulating road W3 at the circular intersection is a straight section and the distance Q of the straight section is equal to or greater than the predetermined distance $Q_{TH}$, the determination condition is not changed to the condition under which it is easy for the entry into the intersection to be determined to be allowed even when the host vehicle M enters the circular intersection. Therefore, it is possible for the host vehicle M to enter the circular intersection at a more appropriate timing.

Further, according to the second embodiment described above, even when the distance Q of the straight section is equal to or greater than the predetermined distance $Q_{TH}$, the determination condition is changed to the condition under which it is easy for the entry into the intersection to be determined to be allowed in a case in which the entry angle θ at the time of entry into the circulating road W3 from the road W1 including the host lane is larger than 90 degrees and the entry angle θ is an obtuse angle. Therefore, it is possible for the host vehicle M to rapidly enter the circular intersection, and it is possible to smooth traffic.

Third Embodiment

Hereinafter, a third embodiment will be described. In the first embodiment and the second embodiment described above, the determination condition has been changed when the intersection present ahead in the traveling direction of the host vehicle M is a circular intersection. On the other hand, the third embodiment is different from the first and second embodiments in that, when the intersection present ahead in the traveling direction of the host vehicle M is another intersection of a type different from the circular intersection, the determination condition is changed. Hereinafter, differences from the first and second embodiments will be mainly described, and descriptions of functions and the like that are the same as those in the first and second embodiments will be omitted.

Figure 13:
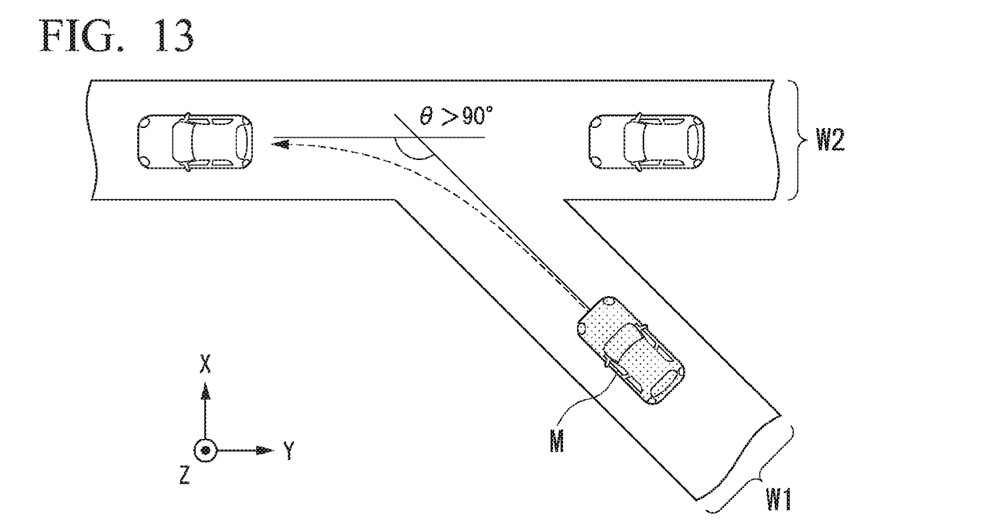
FIG. 13 is a diagram showing an example of a scene in which a determination is made as to whether or not entry into an intersection of a different type from the circular intersection is allowed.

FIG. 13 is a diagram showing an example of a scene in which a determination is made as to whether or not entry into an intersection of a type different from a circular intersection is allowed. An intersection shown in FIG. 13 indicates a three-way intersection in which a road W1 including a host lane has intersected an arterial road W2 having a substantially straight line shape at an angle larger than a right angle in an X-Y horizontal direction. At such an intersection, the determiner 146 according to the third embodiment determines whether or not entry into the arterial road W2 from the road W1 is possible, on the basis of determination condition. The road W1 is an example of a "first road", and the arterial road W2 is an example of a "second road".

Since the road W1 intersects the arterial road W2 at an angle larger than a right angle at the shown three-way intersection, an entry angle θ at the time of entry into the arterial road W2 from the road W1 becomes an obtuse angle equal to or larger than 90 degrees. Therefore, the condition changer 148 according to the third embodiment changes the determination condition to a condition under which it is easy for the entry into the arterial road W2 from the road W1 to be determined to be allowed even when the intersection present ahead in the traveling direction of the host vehicle M is the three-way intersection. For example, the condition changer 148 changes the determination condition to a condition under which it is easier for the entry into the arterial road W2 from the road W1 to be determined to be allowed, in comparison with the three-way intersection in which the road W1 perpendicularly intersects the arterial road W2 as shown in FIG. 4 or 5, by decreasing the threshold value for the relative distance, the TTC, or the like included in the determination condition or increasing the upper limit speed $V_{TH}$.

According to the third embodiment described above, even when the intersection present ahead in the traveling direction of the host vehicle M is an intersection of a type different from the circular intersection, such as a three-way intersection, the determination condition is changed to the condition under which it is easy for the entry into the intersection to be determined to be allowed in a case in which the road including the host lane intersects another road at an angle equal to or larger than a right angle. Therefore, the host vehicle M can rapidly enter the intersection. As a result, it is possible to further smooth traffic.

[Hardware Configuration]

Figure 14:
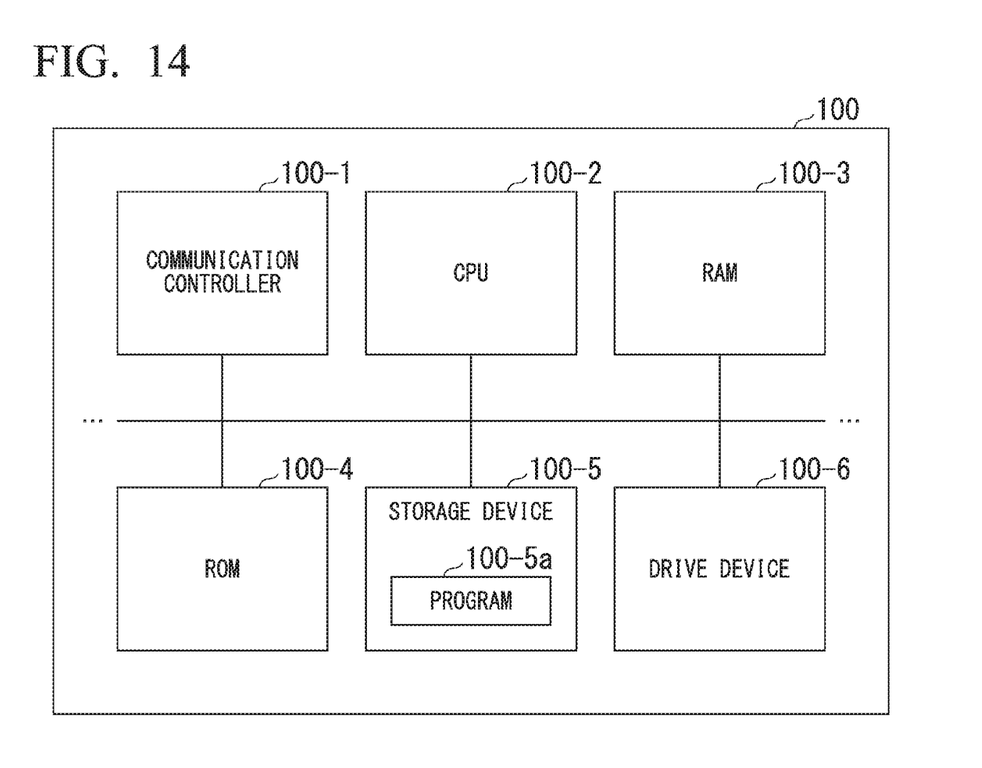
FIG. 14 is a diagram showing an example of a hardware configuration of the automated driving control device of the embodiment.

FIG. 14 is a diagram showing an example of a hardware configuration of the automated driving control device 100 according to the embodiment. As shown in FIG. 14, the automated driving control device 100 has a configuration in which a communication controller 100-1, a CPU 100-2, a RAM 100-3 that is used as a working memory, a ROM 100-4 that is configured to store a boot program or the like, a storage device 100-5 such as a flash memory or an HDD, a drive device 100-6, and the like are connected to each other by an internal bus or a dedicated communication line. The communication controller 100-1 communicates with components other than the automated driving control device 100. A program 100-5*a* to be executed by the CPU 100-2 is stored in the storage device 100-5. This program is developed in the RAM 100-3 by a direct memory access (DMA) controller (not shown) or the like and executed by the CPU 100-2. Accordingly, one or both of the first controller 120 and the second controller 160 are realized.

The embodiments described above can be represented as follows.

A vehicle control device includes a storage that is configured to store a program, and a processor, wherein the processor is configured to recognize a surrounding situation of a vehicle, determine that entry into an intersection is allowed, on the basis of a determination condition, when having recognized that there is the intersection ahead in a traveling direction of the vehicle, cause the vehicle to enter the intersection by controlling one or both of steering and a speed of the vehicle when having determined that the entry into the intersection is allowed, and change the determination condition to a condition under which it is easier for the entry into the intersection to be determined to be allowed in a case in which the recognized intersection is a circular intersection, in comparison with a case in which the recognized intersection is another intersection different from the circular intersection, by executing the program.

Although a mode for carrying out the present invention has been described above using the embodiment, the present invention is not limited to the embodiment at all, and various modifications and substitutions may be made without departing from the spirit of the present invention.

What is claimed is:

1. A vehicle control device comprising:
   a processor; and
   a memory that stores instructions that, when executed by the processor, facilitate performance of operations, comprising:
   recognizing a surrounding situation of a vehicle;
   determining that entry into an intersection is allowed, based on a determination condition, in response to recognizing that there is the intersection ahead in a traveling direction of the vehicle;
   facilitating the vehicle to enter the intersection by controlling one or both of steering and a speed of the vehicle in response to determining that the entry into the intersection is allowed; and
   changing the determination condition to a first condition for the entry into the intersection in response to determining that the intersection is a circular intersection, and changing the determination condition to a second condition in response to determining that the intersection is another intersection different from the circular intersection.

2. The vehicle control device according to claim 1, wherein the operations further comprise in response to determining that the intersection is the circular intersection, changing the determination condition to the first condition based on an angle of entry into the circular intersection.

3. The vehicle control device according to claim 1, wherein the operations further comprise not changing the determination condition in response to determining that a partial section of a ring road included in the circular intersection has a straight line shape and a length of the partial section is equal to or greater than a predetermined distance.

4. The vehicle control device according to claim 3, wherein the operations further comprise changing the determination condition to the first condition even when the partial section has the straight line shape and the length of the partial section is equal to or greater than the predetermined distance in response to determining that a road for entry into the circular intersection intersects the partial section at an angle larger than a right angle with respect to a horizontal direction.

5. A vehicle control device comprising:
   a processing circuitry configured to:
   recognize a surrounding situation of a vehicle;
   determine that entry of the vehicle to a second road different from a first road is allowed, based on a determination condition, in response to determining that the vehicle enters the second road from the first road among a plurality of lanes recognized as the surrounding situation;
   control one or both of steering and a speed of the vehicle to facilitate the vehicle to enter the second road in response to determining that the entry to the second road is allowed; and
   change the determination condition to a first condition in response to determining that the entry into the second road does not perpendicularly intersect the second road with respect to a horizontal direction, and changing the determination condition to a second condition in response to determining that the first road perpendicularly intersects the second road.

6. A vehicle control method comprising:
   recognizing, by an in-vehicle computer comprising a processor, a surrounding situation of a vehicle;
   determining, by the in-vehicle computer, that entry into an intersection is allowed, based on a determination condition, in response to having recognized that there is the intersection ahead in a traveling direction of the vehicle;
   facilitating, by the in-vehicle computer, the vehicle to enter the intersection by controlling one or both of steering and a speed of the vehicle in response to having determined that the entry into the intersection is allowed; and
   changing, by the in-vehicle computer, the determination condition to a first condition for the entry into the intersection in response to determining that the intersection is a circular intersection, and changing the determination condition to a second condition in response to determining that the intersection is another intersection different from the circular intersection.

7. A computer-readable non-transitory storage medium storing a program, the program causing an in-vehicle computer to execute:
   a process of recognizing a surrounding situation of a vehicle;
   a process of determining that entry into an intersection is allowed, based on a determination condition, in response to having recognized that there is the intersection ahead in a traveling direction of the vehicle;
   a process of facilitating the vehicle to enter the intersection by controlling one or both of steering and a speed of the vehicle in response to having determined that the entry into the intersection is allowed; and
   a process of changing the determination condition to a first condition for the entry into the intersection in response to determining that the intersection is a circular intersection, and changing the determination condition to a second condition in response to determining that intersection is another intersection different from the circular intersection.

* * * * *